United States Patent [19]

Brock et al.

[11] 4,393,175
[45] Jul. 12, 1983

[54] PROCESS FOR THE CONTINUOUS DIAZOTIZATION OF WATER-SOLUBLE POLYMERIC AMINES

[75] Inventors: Phillip J. Brock, Sunnyvale; Daniel J. Dawson, Los Altos, both of Calif.

[73] Assignee: Dynapol, Palo Alto, Calif.

[21] Appl. No.: 300,621

[22] Filed: Sep. 9, 1981

[51] Int. Cl.³ .............................................. C08F 8/30
[52] U.S. Cl. .................................. 525/377; 523/344; 525/328.2; 525/328.4
[58] Field of Search .......................... 523/344; 525/377

[56] References Cited

U.S. PATENT DOCUMENTS

Re. 30,362  8/1980  Gless, Jr. et al. .................... 525/355
3,920,855  11/1975  Dawson et al. ...................... 426/250
4,190,716  2/1980  Parkinson et al. .................. 525/334

OTHER PUBLICATIONS

"Chemical Engineers' Handbook", John H. Perry, Ed., third ed., McGraw-Hill Book Co., Inc., New York, 1950, pp. 1216.

Primary Examiner—Joseph L. Schofer
Assistant Examiner—Bernard Lipman
Attorney, Agent, or Firm—Burns, Doane, Swecker & Mathis

[57] ABSTRACT

An improvement in the diazotization of polymeric amines is disclosed that minimizes crosslinking problems. Solutions of nitrite ion and polymeric amine are concurrently continuously fed at controlled rates to a turbulently agitated limited volume mixing zone.

6 Claims, 1 Drawing Figure

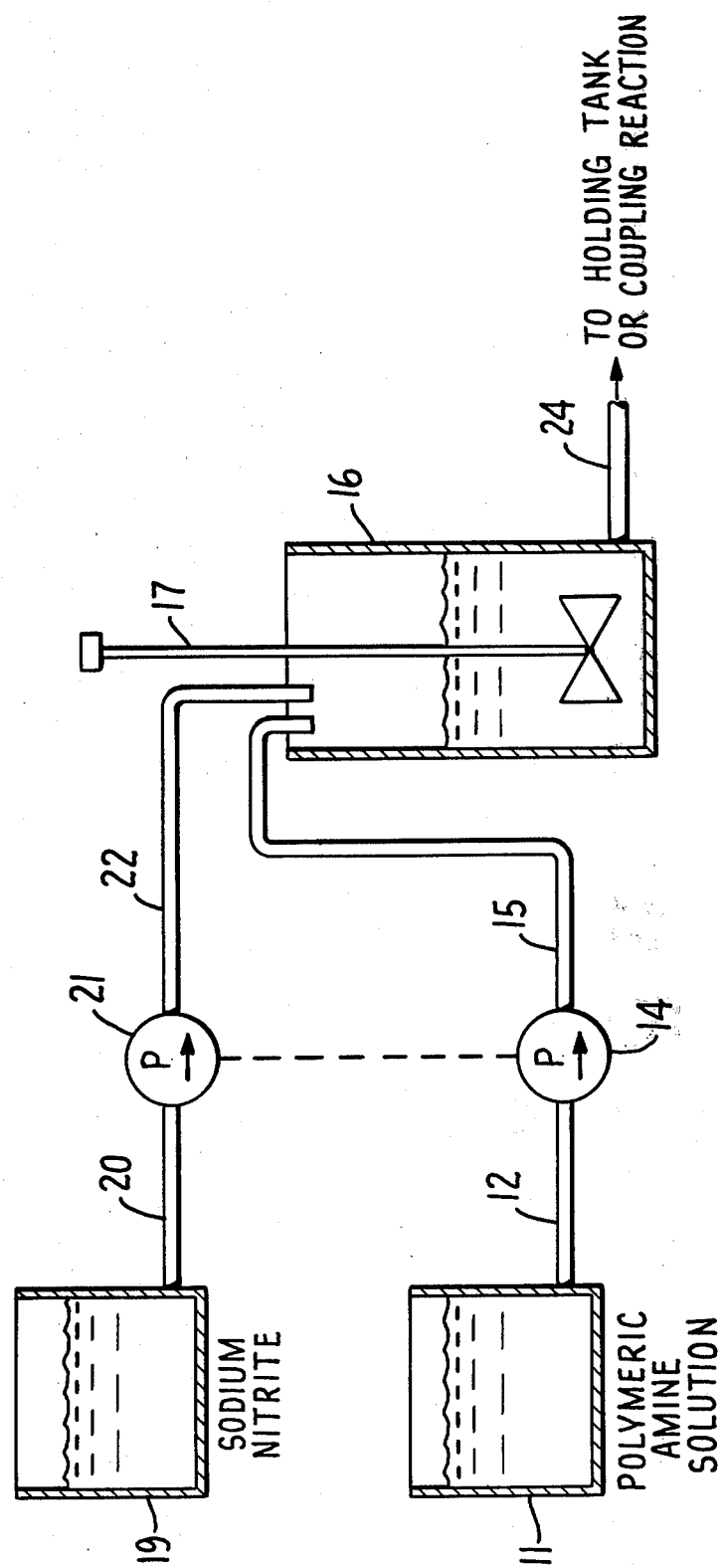

PROCESS FOR THE CONTINUOUS DIAZOTIZATION OF WATER-SOLUBLE POLYMERIC AMINES

BACKGROUND OF THE INVENTION

1. Field of the Invention

This invention relates to a process for the continuous diazotization of water-soluble polymeric amines. In a preferred embodiment, it applies this process to the preparation of azobond containing polymeric materials useful as pharmaceuticals.

2. Discussion of the Prior Art

The following United States Patents are commonly assigned herewith and are believed to be representative of references that relate to the present invention—U.S. Pat. Nos. 3,920,855, Dawson et al; 4,190,716, Parkinson et al; and Re 30,362, Gless et al.

These references disclose that a polymeric aromatic amine can be reacted with nitrous acid at low temperature to form a polymeric diazonium salt, and that this diazonium salt can thereafter have various aromatic groups attached so as to form polymeric dyes, (See Dawson et al and Gless et al); polymeric pharmaceuticals, (See Parkinson et al); and the like. It is also known to substitute other diazotizing moieties for nitrous acid or to use other coupling agents such as materials of the structure

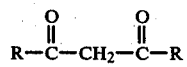

wherein R is an alkyl, alkoxy, alkylamine, etc; in place of the aromatic coupling groups.

In the course of the diazotization steps involving a polymeric aromatic amine, the polymer will go through a state in which both diazo groups and amines are present on the same and on neighboring polymer molecules:

The diazo groups can react with amines to form a triazine crosslink which will render the polymer insoluble. This triazine-forming reaction is reversible and, if the polymer has not contracted to a highly condensed phase (a precipitate), diazotization will proceed and a fully soluble polymeric diazonium salt will result. However, if the polymer forms a condensed phase, the probability of polymer-polymer reactions involving the highly reactive diazo group becomes so high that a multitude of crosslinks form, many of which are not reversible (eg),

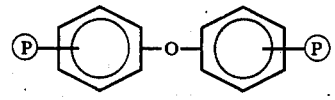

In this case, the polymer is permanently crosslinked and insoluble.

Accordingly, if one desires to produce soluble derivatives of polymeric diazonium salts, for example, polymeric azo dyes or polymeric azo group-containing pharmaceuticals, it is critical to diazotize in such a fashion that a condensed polymer phase never forms. This operation can be successfully conducted on a small scale (up to 1-5 liters in volume) by means of rapid addition of greater than one equivalent of sodium nitrite solution to an acidic polymeric amine solution, with thorough agitation. However, on a larger scale, it becomes impractical, often impossible, to duplicate this process. In the case of a polymeric amine with a DP=1400, if the sodium nitrite addition takes over 5–10 seconds, some degree of permanent crosslinking is inevitable; clearly, mixing hundreds of gallons of solutions in less than 5 seconds is not generally feasible.

STATEMENT OF THE INVENTION

It has now been found that the problems posed by production scale diazotization can be overcome by employing a quick turnover continuous process wherein two synchronized pumps independently deliver the solutions of polymer and nitrite to a turbulently mixed mixing chamber at a rate of at least one chamber volume per minute and continuously withdrawing the reaction solution.

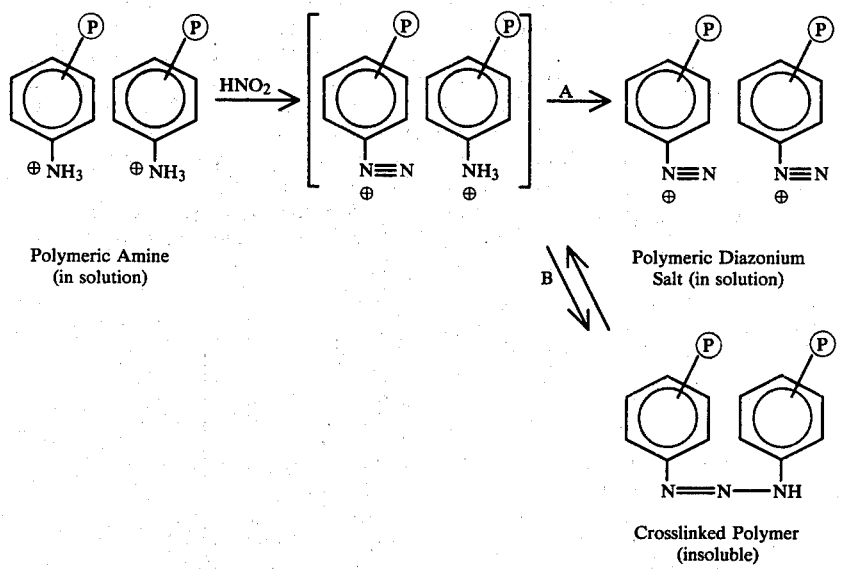

BRIEF DESCRIPTION OF THE DRAWING

The invention will be described with reference to the accompanying drawing, a schematic of the process of this invention.

DETAILED DESCRIPTION OF THE INVENTION

Reactor Thruput

The process of the present invention is a continuous diazotization process in which two reactant solutions, an acidic polymeric aromatic amine solution and a nitrite salt solution are continuously charged to a limited volume turbulent reaction zone. The charging rate should be controlled to provide a proper turnover rate within the reaction zone. This turnover rate also referred to as liquid hour space velocity or LHSV, should be greater than one chamber volume per minute that is an LHSV greater than 60 hrs$^{-1}$. Preferably, the rate is greater than 1.2 chamber volumes per minute (LHSV greater than 72 hrs$^{-1}$). There is no definite upper limit for feed rates although, practically, rates greater than about 30 volumes per minute (LHSV's greater than 1800 hrs$^{-1}$) are rarely employed.

Other Reaction Conditions

The reaction zone is agitated by conventional means adapated to the reaction zone geometry. The reaction zone may, if desired, be a closed zone or open and may be blanketed with an inert atmosphere.

The conditions in the reaction zone are generally defined to be effective diazotization conditions. These include low to moderate temperatures; say from $-5°$ C. to $50°$ C. preferably from $+5°$ C. to $45°$ C. and more preferably from $+10°$ C. to $45°$ C.; and a highly acidic pH, preferably from pH 0 to pH 6 and more preferably from pH 0 to pH 4 and most preferably from pH 0 to pH 1. About one molar HCl or HBr or mixtures thereof are excellent reaction media.

The relative amounts of $NO_2^-$ (nitrite ion) and aromatic amine are preferably controlled as well. At least 1.0 moles of $NO_2^-$ must be present for each mole of diazotizable aromatic amine. Good results are obtained when from 1.00 to 1.35 moles of $NO_2^-$ ion are fed per mole of diazotizable aromatic amine, preferably from 1.05 to 1.25 moles of $NO_2^-$ are fed per mole of diazotizable aromatic amine with slight excesses beyond equimolarity i.e., 1.1 to 1.2 moles of $NO_2^-$ per mole of amine being most preferred.

The source of $NO_2^-$ ion is most commonly and preferably $NaNO_2$. Other equivalent materials, such as $KNO_2$ may be used as well.

The concentrations of the two reactants is not considered critical to the successful practice of the invention so long as the relative amounts are as noted. However, they are generally controlled as follows: The polymer is usually present in concentrations of 0.5 to about 10% by weight, preferably 1% to 6% by weight. The $NO_2^-$ ion is fed as a solution in a concentration of about 0.1 to 10.0 moles per liter, and preferably of about 0.25 to 2.0 moles per liter.

The reaction medium is an inert medium, generally an aqueous medium, optionally containing substantial amounts, say up to about 90% by weight of a water-miscible organic solvent such as methanol, ethanol, isopropanol, tetrahydrofuran, ethylene glycol, 2-ethoxyethanol, or 2-methoxyethanol. Preferred solvents include water, and water-2-methoxyethanol or water-2-ethoxyethanol mixtures containing up to 65% by weight 2-alkoxyethanol.

The aforedescribed other reaction conditions are not intended to be limitations on the process of this invention but rather to guide one in its practice. Accordingly, they can be varied as might be obvious to one skilled in the art.

The Amine-Containing Polymer

The amine-group-containing polymer diazotized by this process is an aromatic amine that may take either of two structures. In one, the aromatic groups are present as groups pendant from an organic chain which links them together into the desired polymer backbone. In the other, the aromatic groups are present within the organic chain itself. Mixtures of the two structures are possible, as well.

These two structures can be represented by the generic formula

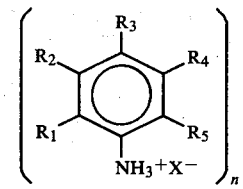

wherein n is an integer greater than 1; $X^-$ is an anion, such as a halide—e.g. $Cl^-$; at least one but not more than two of the R's are covalent links bonding the n aromatic rings into a polymeric unit molecule; and the remaining R's are independently selected from hydrogens or usual organic substituents, such as hydroxyls, amides, sulfonates, carboxylates, lower alkyls, esters, ethers or the like. In addition, two of $R_1$ through $R_5$ can be joined to form an aromatic ring fused to the illustrated ring. This fused aromatic ring can be the point of bonding into the polymer, if desired. Such amine-containing aromatic rings or their alkyl or fused aromatic substituents can be substituted with alkyls, hydroxyls, carboxyls, sulfonates, and the like as well. Preferably, the aromatic group with its optional substituents contains from 6 to 14 carbons inclusive and not more than two fused aromatic rings and up to three substituents (in addition to its mandatory amine and linking groups) selected from sulfonates, hydroxyls and carboxyls.

The pendant structure may be represented structurally as a polymer having n recurring units of the formula

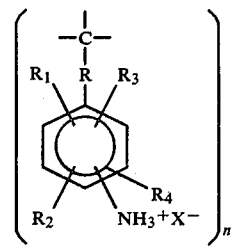

wherein C is a portion of an organic chain linking the units together; n is an integer greater than 1, preferably from 5 to 40,000, and more preferably from 10 to 10,000 and $X^-$ is an anion, preferably a halide —$Cl^-$, $I^-$, $Br^-$ or F⁻ and more preferably Cl⁻; R is a linking group, such term being defined to include a carbon-carbon single bond, an amine group, a sulfonamide group, an ether link, an ester link, an amide link, a carbamate link, an alkyl or, together with one of $R_1$-$R_4$, a fused aryl which itself depends from the backbone by one of the aforementioned links. $R_1$-$R_4$ are as already described.

When the aromatic groups are in the chain itself, the following structure is present

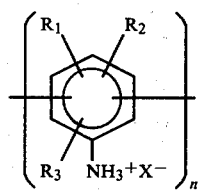

wherein $R_1$, $R_2$ and $R_3$ as well as n and $X^-$ are as previously set out.

A number of examples of suitable amine-containing polymers are given in a series of preferred embodiments. These are merely representative and are not to be construed as limiting the scope of the polymers usefully diazotized in the practice of this invention. Accordingly, other art-known backbones which would provide the desired aromatic amines could be employed as well as the materials herein specifically embodied.

EMBODIMENT 1.

Backbone: Polystyrene
Preparation:

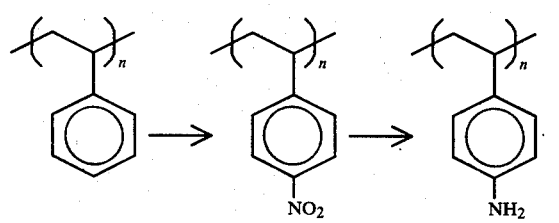

The embodiment can also employ commercially available polyaminostyrene or styrene copolymers such as with ethylene or the like.

EMBODIMENT 2.

Backbone: Poly(vinylamine)*-Based Polysulfanilamide.
Preparation:

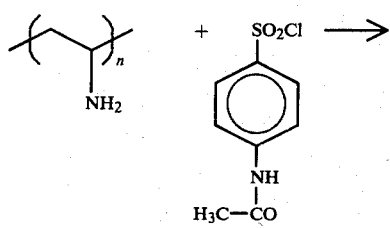

-continued
EMBODIMENT 2.

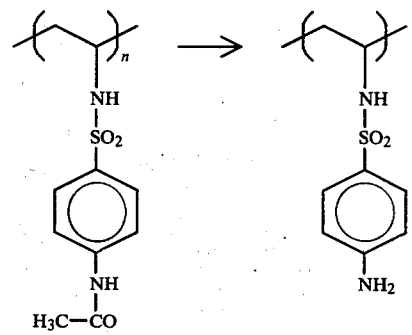

*Prepared such as by the method of U.S. Pat. No. 4,018,826.

EMBODIMENTS 3, 4 AND 5

Backbone: The same as in Embodiment 2 except that the following units are copolymerized with the vinylamine units.

Embodiment 3—Acrylic acid (1-99 mole% basis number of total vinyl units). Such backbone materials and their preparation are shown in U.S. Pat. No. 3,920,855.

Embodiment 4—Vinyl sulfonate (1-99 mole% basis number of total vinyl units). Such copolymers and their preparation are shown in U.S. Pat. No. 4,096,134.

Embodiment 5—Ethylene (1-99 mole % basis number of total vinyl units).

EMBODIMENT 6.

Backbones: Poly(ethylenimine)-Based Polysulfanilamide.
Preparation:

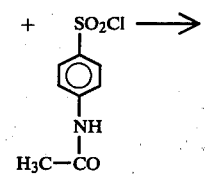

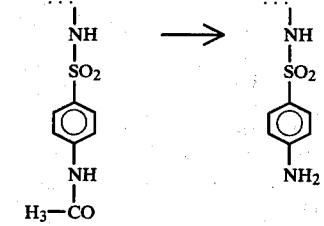

EMBODIMENTS 7, 8, 9, 10 AND 11.

Backbone: Polyvinylamine, its copolymers, shown in Embodiments 3, 4, and 5, and poly(ethylenimine) following reaction with COCl
NO₂

Representative Preparation:

-continued

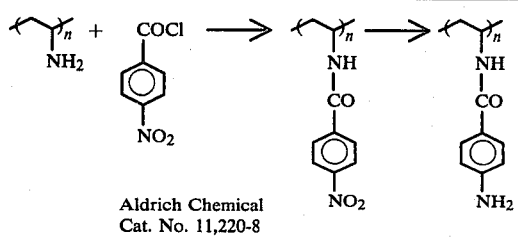

Aldrich Chemical
Cat. No. 11,220-8

EMBODIMENTS 12, 13, 14, 15 AND 16.

Backbone: Poly(vinylamine), its copolymers shown in Embodiments 3, 4 and 5, and poly(ethyleneimine) following reaction with

Representative preparation:

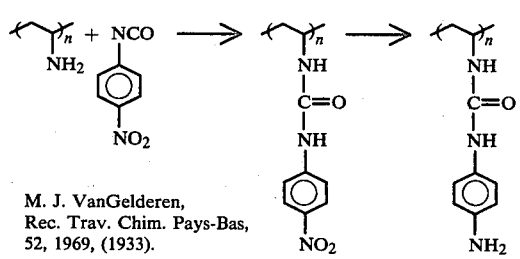

M. J. VanGelderen,
Rec. Trav. Chim. Pays-Bas,
52, 1969, (1933).

EMBODIMENT 17.

Backbone: Poly(N—methylvinylamine) following reaction with

Preparation:

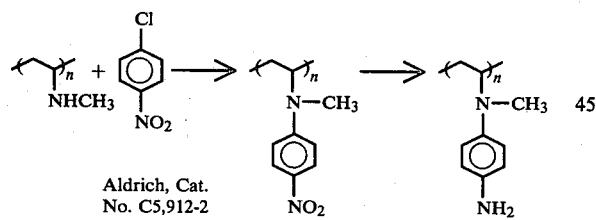

Aldrich, Cat.
No. C5,912-2

EMBODIMENT 18

Backbone: Use, instead of a homopolymer of N-methylvinylamine, a copolymer with from 1–99 mole % (basis total vinyl units) of ethylene, vinylsulfonate or acrylic acid.

EMBODIMENT 19.

Backbone: Poly(vinyl alcohol) following reaction with

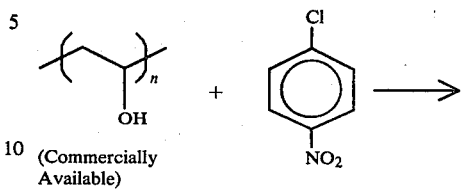

Preparation:

EMBODIMENT 19.

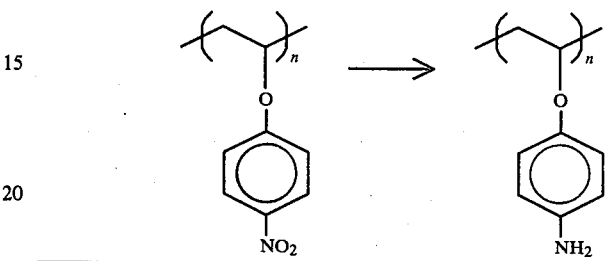

(Commercially Available)

This same embodiment can also employ a copolymer of vinyl alcohol.

EMBODIMENT 20.

Backbone: Poly(vinyl alcohol) (or copolymers of vinyl alcohol) following reaction with

Preparation:

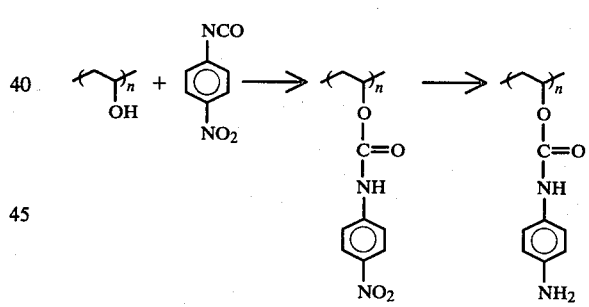

EMBODIMENT 21.

Backbone: Poly(acryloyl chloride) following reaction with

Preparation:

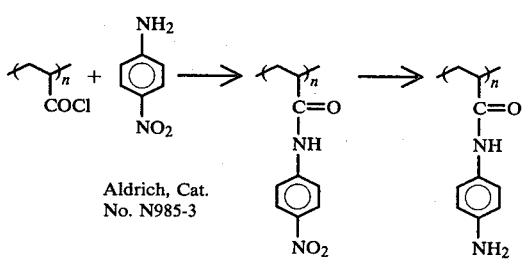

Aldrich, Cat.
No. N985-3

-continued

EMBODIMENT 22.

Backbone: Poly(acryloyl chloride) following reaction with

NO₂

Preparation:

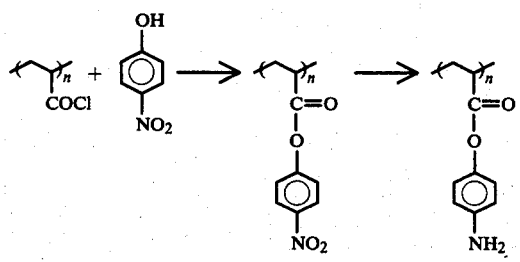

EMBODIMENT 23.

Backbone: Poly(epichlorohydrin) following reaction with p-nitrophenol.

Preparation:

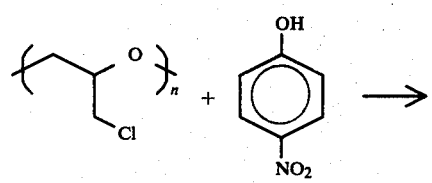

EMBODIMENT 35.

Backbone: Poly(ethylene terephthalate)
Preparation:

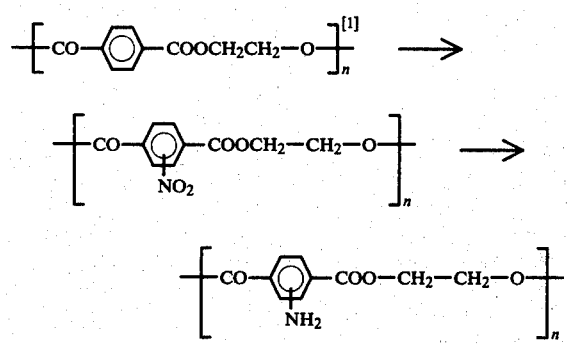

[1]C. G. Overberger, Macromol. Synth., 1, 17 (1963).

Backbones based on alkylamine-group-containing polymers, especially those shown in Embodiments 2 through 6 are preferred. These materials are available and art-known, or based on available art-known precursors.

The process of the invention is further illustrated by the Drawing which shows a schematic view of the process wherein feed chamber 11 contains a 2% by weight pH 0.5 solution of polymer of the formula

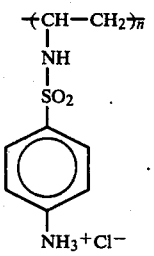

This solution is passed through line 12 to metering pump 14 which drives the solution through line 15 to reactor vessel 16, itself equipped with agitator 17. Alternatively, mixing can be effected by static mixers or by the geometry of the reactor vessel and the feed inlets. Similarly, feed chamber 19 contains a NaNO₂ solution. This solution is passed through line 20 to metering pump 21 which drives it through line 22 to mixing vessel 16 as well. The feed rates of pump 14 and 21 are controlled to feed about 2 volumes of reaction vessel 16 per minute; this rate of feed is matched by an equal rate of withdrawal of product via line 24.

The following example is provided to illustrate the invention and is not to be construed as a limitation of its scope.

EXAMPLE

Precursor Polymer Preparation

A stock of poly(vinylacetamide) was prepared by (1) condensing acetamide and acetaldehyde in the presence of acid to form ethylidene bisacetamide, (2) cracking the ethylidene bisacetamide to give vinyl acetamide and (3) polymerizing the vinyl acetamide. This preparation is described in detail in *J.Am.Chem.Soc.* 98, 5996 (Sept. 15, 1976) and for brevity is not here described in detail. The polymer product was purified by ultrafiltration to remove low molecular weight materials to yield a product having a median molecular weight by gel permeation comparison to polystyrene standards ($M_p{}^{ps}$) of $1.2 \times 10^5$. This polymer was hydrolyzed with hydrochloric acid as follows:

A 10–15 wt% solution of poly(vinylacetamide) in water containing 1.4 equivalents of hydrochloric acid was heated at reflux under argon for 20 hours to obtain a homogeneous aqueous poly(vinylamine hydrochloride) solution.

The crude product of this hydrolysis was an aqueous solution having the following general composition:

| | |
|---|---|
| Poly(vinylamine) hydrochloride | 1.4–2.2 meq/g |
| Acetic Acid | one mole per mole of poly(vinylamine) hydrochloride |
| Free Cl⁻ | 0.56–0.88 meq/g |
| Water | remainder |

The crude product of the hydrolysis was used directly in a Schotten-Baumann coupling by adding base (NaOH) and 2-methoxyethanol to give a clear homogeneous pH 9–10 solution containing about 2% by weight poly(vinylamine) (as amine) and 62% by volume 2- methoxyethanol. p-Acetamidobenzenesulfonyl chloride (1.2 equivalents, basis polymeric amine units) was then added in 3 equal portions with agitation while the pH was maintained in the range 9.5–10 by the addition of base. The agitation was continued at ambient conditions and pH was maintained at 9–11 by base addition for 2 hours after the last addition of the sulfonyl chloride to yield a homogeneous solution of

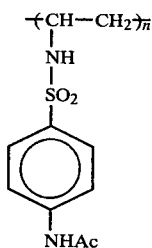

polymer.

This polymer solution was directly hydrolyzed without prior isolation of the polymer therefrom by adding 3.5 equivalents (basis acetamido units) of concentrated HCl and heating to 80° C. for 4 hours with agitation. This hydrolyzed the acetamido units to amines. The presence of the 2-methoxyethanol was responsible for being able to carry out the Schotten-Baumann coupling and subsequent hydrolysis as an unbroken sequence without isolation of intermediates or resorting to troublesome emulsions or suspensions.

Diazotization with Twin Pumps

A lot of 3.7 kg of

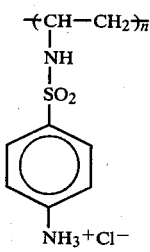

in 2-methoxyethanol/water as prepared above (total weight 50.76 kg) was stirred overnight with 2.657 kg of hydrochloric acid (21° Baume) and 2.31 kg of deionized water. This yielded 55.6 kg (50.6 liters) of solution.

The diazotization was carried out in a continuous high speed flow system employing a pair of ganged peristaltic pumps to feed the polymer solution and a sodium nitrite solution.

The dual peristaltic pump system was set up using a Masterflex TM motor drive and controller model number 7545 fitted with pump head number 7018 which was equipped with silicone tubing (0.4390" O.D., 0.3130" I.D.) for pumping polymer solution. Because of the flexible nature of this tubing, it was supported (outside the pump housing) by fitting it with a "sleeve" of more rigid, reinforced Tygon TM tubing. The motor drive was also fitted with Masterflex TM pump head number 7016 equipped with silicone tubing (0.2510" O.D., 0.1250" I.D.) for transfer of nitrite solution. The flow ratio for the two pumps was 4:1 by measuring the volumes of liquids pumped for a short time interval. At this flow ratio, the volume of nitrite solution required was determined to be 13.9 l [=50.55 l (vol. polymer soln.)×0.25 (flow ratio)×1.1 (safety factor)]. A solution of 1.738 kg of sodium nitrite (1.2 equivalents) was prepared and diluted to 13.9 l with deionized water.

A 1 l, four-necked, round-bottom flask was set up with an efficient overhead stirrer and a large diameter outlet tube leading to a 30 gallon polyethylene tank equipped with a thermowell. The exit tubes of the ganged pumps were positioned inside the flask through the other two necks. The flask was than charged with 500 ml of deionized water.

The coupling reaction system was then set up. A 100 gallon polyethylene tank was equipped with an air-driven overhead stirrer, a centrifugal pump (Flotec Model C6P8 with 3½" or 4" impeller), a peristaltic pumping system for the addition of 50% sodium hydroxide solution (capacity greater than 4 l/hr), and a pH probe which had been calibrated in pH 12.0 buffer at 25° C. The centrifugal pump was fitted with a "T" fitting at the pump inlet to allow for the simultaneous intake of polymeric diazonium solution and circulating coupling reaction medium with mixing occurring in the impeller housing. The tank was then charged with 40 gallons of deionized water and 6.83 kg (49.49 moles; 2.38 equiv., basis total aromatic amine by actual assay) of salicylic acid. The air-driven stirrer was turned on to moderate speed and sufficient sodium hydroxide was added to dissolve the salicylic acid and raise the solution pH to 12.5. Ice was loaded into the tank until a temperature of 10°–13° C. was achieved.

At this point, both reaction systems were ready. The stirrer of the 1 l flask mixing chamber for the diazotization was turned on to moderate speed and 25 ml of the prepared sodium nitrite solution and 5 ml of 21° Baumé hydrochloric acid were added. The pump exit tubes were adjusted to discharge their reactant streams below the surface of circulating liquid and the stirrer was then turned on full. The ganged peristaltic pumps' motor drive was turned on to maximum output to initiate the diazotization reaction. Aliquots were taken periodically during the course of the reaction from the mixing chamber outlet tube, and all were found to be visually clear and precipitate-free.

When all the polymer solution had been added (29.1 minutes required), the pump motor drive was immediately turned off. The solution remaining in the mixing chamber was added to the diazonium solution reservoir tank and this material was used immediately in the coupling reaction. (Some sodium nitrite solution remained but was discarded.)

Introduction of the polymeric diazonium solution into the circulating coupling medium was initiated by removing a clamp from the inlet tubing which had been placed near the "T" fitting. Addition of the 17.5 gallons of diazonium solution required 113 minutes (average addition rate was 585 ml/minute). The reaction pH was maintained in the range 12.6–12.9 by the concurrent addition of 50% sodium hydroxide solution below the reaction medium surface while the reaction temperature was maintained in the range 10°–13° C. by the addition of ice as necessary. At the conclusion of the polymer addition, the centrifugal pump was turned off but reaction mixing was continued via the overhead stirrer for an additional hour. At the end of this time, the agitator was turned off and the mixture was allowed to stand overnight while warming to 20° C.

The reaction mixture was transferred to a tared 100 gallon tank using approximately 10 l of rinse water. The total weight was 327.6 kg. A 300 ml sample was removed and, via centrifugation, was shown to contain no precipitated material. A 262.5 g portion of this material was readily passed through a glass fiber (GF/A) filtration disk and ultrafiltered with deionized water make-up for 20 diavolumes. The resultant solution was lyophilized to afford 3.64 g of orange solid 1, which extrapolated to a batch yield of 4.54 kg.

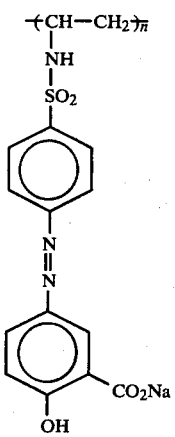

Utility of the Product

The product of this example is identical to the product shown in U.S. Pat. No. 4,190,716 which product is there shown to effectively release the desirable intestinal drug, 5-aminosalicylic acid, in the bowel.

What is claimed is:

1. In a process of diazotizing a polymeric aromatic amine wherein a solution of the polymeric amine is admixed with a solution of nitrite ion, the improvement comprising continuously feeding said solutions to a turbulent reaction zone at a combined liquid flow rate of not less than one reaction zone volume per minute and continuously withdrawing the resulting reaction product to maintain the reaction zone liquid volume.

2. The process of claim 1 wherein said combined liquid flow is at a rate of not less than 1.2 reaction zone volumes per minute.

3. The process of claim 1 wherein said turbulent reaction zone includes mechanical agitation means.

4. The process of claim 3 wherein said solution of polymeric aromatic amine is a solution of an amine of the formula

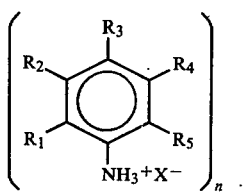

wherein n is an integer greater than 1, $X^-$ is an anion, at least one but not more than two of the R's are covalent links bonding the n aromatic rings into a polymer unit molecule and the remaining R's are independently selected from among hydrogens, hydroxyls, amides, sulfonates, carboxylates, lower alkyls, and esters.

5. The process of claim 4 wherein said polymer unit molecule has a polymeric backbone of poly(vinylamine).

6. The process of diazotization of a polymeric aromatic amine salt of the formula

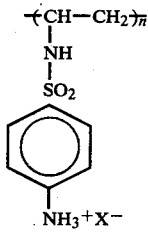

wherein n is an integer greater than 1 and $X^-$ is a halogen anion which comprises feeding a 0.5% to 10% by weight solution of said polymeric aromatic amine salt and a separate solution of 1 to 1.35 equivalents of nitrite ion to a turbulent reaction zone at a combined liquid flow rate of not less than 1 reaction zone volume per minute and a pH of from pH 0 to pH 4 and a reaction temperature of from $-5°$ C. to $50°$ C. and continuously withdrawing the resulting reaction product to maintain the reaction zone liquid volume.

* * * * *